United States Patent Office 3,431,202
Patented Mar. 4, 1969

3,431,202
COMPLEX POLYMERIC PRODUCT AND PROCESS
Lloyd Eugene Van Blaricom and Frederic Alan Johnston, Shelton, Wash., assignors to ITT Rayonier Incorporated, a corporation of Delaware
No Drawing. Continuation of application Ser. No. 459,091, May 26, 1965. This application Dec. 4, 1967, Ser. No. 687,915
U.S. Cl. 252—8.5                              2 Claims
Int. Cl. C09k 3/00

ABSTRACT OF THE DISCLOSURE

A polymeric zinc complex for use in controlling the rheological properties of aqueous clay base drilling muds, said zinc complex having been prepared by digesting a coniferous tree bark or quebracho wood in an aqueous solution of a sulfurous acid salt of sodium or potassium to obtain a sulfited polyphenolic extract and then reacting the sulfited extract with zinc salt to produce the polymeric zinc complex.

---

This application is a continuation of application Ser. No. 459,091, filed May 26, 1965 which in turn is a continuation-in-part of application Ser. No. 235,809, filed Nov. 6, 1962, both now abandoned.

This invention relates generally to soluble reaction products of bark and quebracho wood. More specifically, the invention relates to the sulfited derivatives of certain coniferous tree barks and quebracho wood, and has for its object the treatment of the derivatives with a soluble salt of zinc and provides improved polyphenolic-type products therefrom.

It is an object of this invention to provide a process for improving certain sulfited derivatives of coniferous tree barks, and quebracho wood, by complexing the derivatives with zinc and the resulting products.

Coniferous tree barks and quebracho wood are known to contain substantial amounts of complex polyphenolic compounds which can be used as components of drilling muds, plywood adhesive, plastics, tanning agents, molding compounds, etc. Because of their relatively low cost when compared with pure phenolics they have long been of interest to the art. Use, however, has been restricted by their complexity and by the fact that their characteristics are influenced sharply and unpredictably by extraction conditions, the type of extractant, and the source of the raw material. Polyphenolics from tree barks and quebracho wood are condensed tannins and structurally similar compounds of higher molecular weight and in general have polymeric flavonoid structures.

Sulfited polyphenoilc derivatives of coniferous barks and unsulfited quebracho wood extracts are widely used as viscosity and fluid loss control agents for clay-containing aqueous or oil-emulsion drilling muds. In many instances, they perform their intended functions quite satisfactorily. When substantial contamination, such as with salt or gypsum, is encountered, however, their effectiveness is greatly reduced. Electrolyte contamination of this type causes colloidal clay components in the mud to start to gel, undesirably raising viscosities and gel strengths. On the other hand, field experience indicates that in many cases an improved mud can be obtained by deliberately contaminating a fresh water mud by adding to it appreciable amounts of gypsum, if the viscosity and gel strength can be controlled. Such a gypsum-containing mud possesses certain advantages, including high temperature stability and a decreased tendency to hydrate and swell the shale and clay formations being drilled. We have discovered that complexing certain sulfited bark and quebracho extracts with zinc overcomes the adverse effects of gypsum contamination and enhances its beneficial effects when said products are used as control agents in aqueous clay-containing drilling muds. This was surprising since it has long been common knowledge to those interested in this art that in contrast to most bivalent metals zinc does not usefully improve lignin-containing extracts of wood such as lignosulfonates for the same general purpose.

Extensive investigation indicates that the derivatives benefited by the process of our invention include those from the barks of western hemlock (*Tsuga heterophylla*), Amabilis fir (*Abies amabilis*), Douglas fir (*Pseudotsuga menziesii*), Redwood (*Sequoia sempervirens*), and southern pine (*Pinus elliotti, Pinus palustris, Pinus taeda* and *Pinus echinata*) trees and quebracho wood (known as "Quebracho Colorado" or *Schinopsis lerentzi* and *Schinopsis balansae*). Unsulfited derivatives do not appear to be improved by zinc complexing.

Suitable extracts for zinc complexing by the methods of this invention can be obtained in good yields by digesting suitably comminuted specimens of the foregoing barks or quebracho wood at elevated temperatures in aqueous solutions of sodium sulfite or bisulfite, potassium sulfite or bisulfite, and/or mixtures of the same. Digestion temperatures should be kept within a range of 105° C. to 200° C., with the preferred range being 150° to 175° C. Below 105° C. good yields are difficult to obtain and the final product is inferior when used as a drilling mud additive, whether complexed with zinc or not. Over 200° C. no appreciable gain in net yield is obtained, and the high temperature tends to degrade the product rather drastically. Suitable digestion times will range from about 15 to 240 minutes, with the period used being adjusted roughly inversely to the temperature. Sufficient chemical should be present in the digestion liquor at the start of the extraction to supply from about 0.03 to 0.2 parts $SO_2$ per part of oven-dry bark or wood to be digested. We have found that a slight excess of chemical must still be present at the conclusion of the digestion to act as a buffer, and it will not be if much less than 0.03 part $SO_2$ per part bark is used. On the other hand, if more than 0.2 part $SO_2$ per part bark is used the yield is not appreciably increased, while the excess chemical remaining in the product after digestion is an unnecessary contaminant. Consistency during digestion is not particularly critical so long as sufficient liquid is present for uniform reaction, but the consistency will most conveniently range between about 10 to 20% oven-dry bark or quebracho wood based on the weight of the total charge. Aqueous extracts of quebracho wood, such as the common commercial extracts can also be sulfited in a similar manner.

Zinc complexing of the extracts is most conveniently accomplished while they are still dissolved in the digestion liquor immediately after its separation from the undissolved residue. If the extract-containing liquor is alkaline at this point, it should be neutralized or adjusted to slightly on the acid side with a suitable acid such as sulfuric or sulfurous (preferably to a pH of 4.5 to 6.0%) to prevent possible gelling of the product upon addition of the zinc salt. Sufficient soluble zinc salt is then added to provide from about 2.0 to 7.0% based on the total weight of the extracted solids with a preferred range of from 2.0 to 6.0%. The zinc salt can be added as a solid or as an aqueous solution, but in either case good mixing should be provided to insure product uniformity. Indeed, if the solid is used, special care must be taken to provide vigorous agitation to prevent agglomeration and floating at the point of admixture. In our preferred embodiment of this step when complexing with zinc we add $$ZnSO_4 \cdot 7H_2O$$

equilavent to 5.0 to 6.0% zinc based on the weight of the extract solids as an aqueous solution. The zinc salt is effective, relatively cheap, and in good commercial supply. For certain purposes other soluble zinc salts can be used but their cost is usually higher.

Complexing in the process of this invention takes place rapidly and on contact. Immediately after mixing the active ingredients, the solution can be spray or drum dried to yield a soluble dark grayish-brown powdered product.

| Zinc, amount based on bark extract solids, percent | Viscosity | | Yield, lbs./ 100 s.f. | Gel strength, lbs./100 s.f. | | Fluid loss, ml./ 30 min. |
|---|---|---|---|---|---|---|
| | Apparent, cp. | Plastic, cp. | | 0 min. | 10 min. | |
| Control, none | 46 | 36 | 20 | 12 | 45 | 7.6 |
| 3.1 | 36 | 30 | 12 | 3 | 21 | .76 |

Duplicate samples of the foregoing were prepared and tested in similar manner on the same base mud, the only difference being the contamination of the samples with NaCl at the rate of 2 lbs./bbl. This was done to show the beneficial effect of the zinc complexes when moderate contamination is encountered in a fresh water mud.

| Zinc based on bark extract solids, percent | Viscosity | | Yield, lbs./ 100 s.f. | Gel strength, lbs./100 s.f. | | Fluid loss, ml./ 30 min. |
|---|---|---|---|---|---|---|
| | Apparent, cp. | Plastic, cp. | | 0 min. | 10 min. | |
| Control, none | 51.5 | 35 | 33 | 33 | 62 | 7.2 |
| 3.1 | 44.5 | 36 | 17 | 11 | 53 | 7.4 |

Temperature is not particularly critical but should not go too high for any appreciable length of time. Under certain conditions, we have found that the temperature of the metal-complexed product solution can be maintained as high as 80 to 90° C. for 4 to 5 hours, but no advantage is gained thereby over a simple room temperature reaction. Theoretically at least, it is possible to do the complexing in the well itself, if the drilling mud contains a suitable sulfited polyphenolic material. It is doubtful, however, if such a procedure would be advantageous, since drilling muds are used on the alkaline side and considerable flocculation of the zinc would therefore take place. We prefer to complex the zinc and organic materials before adding them to a mud, and at a slightly acid pH.

The following examples illustrate details of preferred embodiments of the invention.

Example I

The increased effectiveness of the zinc-organic complex of this invention as drilling mud dispersant for muds that contain a high swelling clay as a major component is demonstrated by this example.

A portion of comminuted hemlock bark was digested in an autoclave with a solution containing a mixture of 75% $NaHSO_3$ and 25% $Na_2SO_3$ equivalent to a ratio of 0.07 part $SO_2$ to 1.0 part dry bark. The digestion was carried out for 45 minutes at a temperature of 170° C., after which the liquor was drained off, the bark residue pressed to recover additional liquor, and the combined draining and pressings evaporated to approximately 40% total solids, to make up the sulfited bark extract solution for complexing with the zinc salt. The complexing itself was accomplished by dividing the bark extract solution into a sufficient number of portions and adding the appropriate amounts of concentrated aqueous solution of the metal complexing salt while agitating the mixture vigorously. The metallic salt used was $ZnSO_4 \cdot 7H_2O$. The complexed materials were then spray dried to dark brown powders. The additives were tested on a fresh water drilling fluid prepared from a mixture of 10 percent high swelling Wyoming Bentonite clay in water by weight. Individual samples were prepared by addition of the indicated metallic complex to an aliquot of the base mud at the rate of 3 pounds/bbl. The pH of the mixture was adjusted to 9.5 with an NaOH solution containing 200 grams of NaOH per liter. The sample was then stirred thoroughly for 20 minutes, aged overnight in an aging cabinet at 160° F., and cooled and tested by the standard procedures for testing drilling fluids as approved by the American Petroleum Institute. The various results are given in the following two tables.

Example II

In this example, a third set of samples were prepared from the same fresh water base mud that was made up for the preceding example. Zinc organic dispersants were prepared and spray-dried, etc., as before in which the amount of metal complexed with the organic component of the product was varied as indicated. The effect of this variation in zinc content is indicated in the following table. All the test conditions are the same as used in the preceding example and the dispersant was added to the mud in each case at the ratio of 3 lbs./bbl.

| Zinc based on bark extract solids, percent | Apparent viscosity, cp. | Gel strength lbs./100 sq. ft. | | Fluid loss ml./30 min. |
|---|---|---|---|---|
| | | 0 min. | 10 min. | |
| Control, none | 41.0 | 9 | 39 | 6.2 |
| 1.0 | 41.5 | 8 | 38 | 6.2 |
| 3.0 | 35.5 | 4 | 17 | 6.8 |
| 5.0 | 34.0 | 2 | 4 | 6.8 |
| 7.0 | 33.0 | 2 | 4 | 7.0 |

Example III

Products having metal contents to give optimum performance characteristics in oil well drilling muds are best prepared using a somewhat acidic pH to avoid excessive thickening of the products in concentrated liquid form. Slightly less effective products having nearly neutral pH can be prepared however, with lower zinc contents as shown in the following example.

An extract of western hemlock bark was prepared by reacting ground bark with a solution containing sodium sulfite and bisulfite equivalent to 0.07 $SO_2$ to bark ratio, said solution having 75% of its $SO_2$ in the form of sodium bisulfite, for 30 minutes at 170° C. The resultant extract liquor was separated from the residual fibrous material and concentrated to 48.2% solids.

The desired zinc-containing product was prepared by adding 41.6 grams of zinc sulfate solution containing 17.6 grams of $ZnSO_4 \cdot 7H_2O$ to 415 grams of the above concentrated extract liquor to give a liquor having a zinc to extract liquor solids ratio of 0.02. The resultant liquor was retained 10 minutes, neutralized to pH 6.9 by the addition of 11.0 grams of 51.4% NaOH, and spray dried using 600° F. inlet air. The above product hereafter referred to as product A had a pH of 7.4 in 1% solution.

A control sample containing no zinc was prepared by neutralizing the concentrated extract liquor to pH 7.5 using 51.4% NaOH and is hereafter called Product B.

Products A and B were added to an aqueous drilling fluid composed of 10% Wyoming Bentonite and 90% water by weight in the amount of 3 pounds of additive per barrel of drilling fluid. The treated drilling fluid was aged for 16 hours at 158° F., and the rheological and fluid loss characteristics of the aged, treated drilling fluid was determined. The results are shown below:

| Sample | pH | Apparent viscosity, cp. | Gel Strength, lbs./100 sq. ft. | | API fluid loss, ml./30 min. |
|---|---|---|---|---|---|
| | | | 0 min. | 10 min. | |
| Product A | 9.15 | 32.5 | 3 | 24 | 6.4 |
| Product A | 9.10 | 33.5 | 3 | 25 | 7.0 |
| Product B | 9.15 | 36.5 | 7 | 33 | 6.2 |
| Product B | 9.15 | 36.5 | 7 | 33 | 6.4 |

The above data indicates that the product containing zinc is more effective for rheological control of the drilling fluid than is the product containing no zinc.

Example IV

Comminuted redwood bark was digested with a solution containing a mixture of 75 percent $NaHSO_3$ and 25 percent $Na_2SO_3$ equivalent to 7 percent $SO_2$ based on the weight of the dry bark. The digestion was continued for 30 minutes at 170° C. after which the extract liquor was separated from the bark residue. The extract liquor was then divided into two portions. One portion designated A1 was spray dried without further treatment. The other portion was treated with sufficient quantities of zinc sulfate to give complexed products containing 4 percent zinc, based on the weight of the extract solids and spray dried. The product was then designated as A2.

Another set of zinc organic products were prepared in a similar manner from more of the comminuted redwood bark except that the digestion was carried out with a straight sodium sulfite solution equivalent to 9 percent $SO_2$ on the weight of the dry bark and the digestion was continued for 30 minutes at 150° C. After complexing in a similar manner with the same chemicals the products were spray dried as before and designated as B1 and B2, respectively.

The foregoing products were tested for their ability to disperse drilling fluids on portions of the same base mud (fresh water containing 10% high swelling Wyoming Bentonite) as before, using the same methods. The results are set out in the following table:

| Sample | Complexed zinc, percent | Apparent viscosity, percent | Gel strength, lbs./100 sq. ft. | | Fluid loss, ml./30 min. |
|---|---|---|---|---|---|
| | | | 0 min. | 10 min. | |
| A1 | ¹0 | 41.5 | 8 | 38 | 6.0 |
| A2 | 4 | 36.0 | 4 | 18 | 6.8 |
| B1 | ¹0 | 59.0 | 8 | 37 | 6.0 |
| B2 | 4 | 42.0 | 3 | 13 | 6.6 |

¹ Control.

Example V

Comminuted Douglas fir and southern pine bark samples were digested with a solution containing a mixture of 75 percent $NaHSO_3$ and 25 percent $Na_2SO_3$ equivalent to 7 percent $SO_2$ based on the weight of the dry bark. The digestion was continued for 30 minutes at 170° C. after which it was cooled and the digestion liquors separated from the bark residue. As in the preceding example the extraction liquors were divided into two parts. One part was spray dried without further treatment. The other part was treated with the sulfate salt of zinc to complex with the organic material 4 percent zinc based on the weight of the extract solids therein.

These products were also tested as dispersants for drilling fluids on portions of the same fresh water drilling fluid and in the same manner as those of the preceding example.

| Bark | Percent zinc based on bark solids | Apparent viscosity, cp. | Gel strength, lbs./100 sq. ft. | | Fluid loss, ml./30 min. |
|---|---|---|---|---|---|
| | | | 0 min. | 10 min. | |
| Douglas fir | ¹0 | 41.0 | 13 | 38 | 6.4 |
| Do | 4 | 34.5 | 3 | 14 | 6.6 |
| Southern pine | ¹0 | 40.0 | 9 | 36 | 7.0 |
| Do | 4 | 32.0 | 3 | 9 | 7.0 |

¹ Control.

Example VI

A sample of commercial grade aqueous quebracho wood extract of the type used in the oil well drilling industry was dissolved in cold water to make up a 35 percent solution by weight. To this solution was added sufficient sodium sulfite to be equivalent to 14 percent $SO_2$ based on the weight of the quebracho extract solids. The mixture was then heated to 150° C. for 30 minutes in order to sulfite the quebracho extract. After cooling to room temperature, portions of the foregoing sulfited quebracho extract were complexed at room temperature with sufficient $ZnSO_4 \cdot 7H_2O$ to provide 4 percent zinc, based on the weight of the sulfited quebracho extract. The portion of the zinc complexed sulfited quebracho extract was then spray dried along with a portion of the uncomplexed material as a control.

The effectiveness of the foregoing dispersant on fresh water mud was tested on samples procured from the same base mud as in the preceding two examples. The same testing procedures were also employed. The results are set out in the following table:

| Percent zinc based on quebracho solids | Apparent viscosity, cp. | Gel strength, lbs./100 sq. ft. | | Fluid loss, ml./30 min. |
|---|---|---|---|---|
| | | 0 min. | 10 min. | |
| 0 (control) | 38.5 | 18 | 38 | 6.8 |
| 4.0 | 28.5 | 3 | 10 | 7.0 |

Example VII

The statement was previously made that it was common knowledge in the art that zinc does not improve the characteristics of lignin containing extracts of wood such as lignosulfonates when used in drilling muds. This example shows the different effect that zinc has on lignosulfonates and bark extracts. The zinc derivatives of the lignosulfonates were prepared by concentrating a calcium base spend sulfite liquor in a laboratory to 39.2% solids content. Samples of this liquor containing 100 grams of the solids were treated with $ZnSO_4 \cdot 7H_2O$ equivalent to 0, 2 and 4 percent zinc based on the weight of the spent liquor solids. The solutions were then thoroughly mixed and the precipitated $CaSO_4$ filtered off and the product solutions spray dried. Bark products of the inventions were prepared from Hemlock bark as previously described containing 0, 2 and 4 percent zinc based on extract solids.

The products were tested in a Wyoming Bentonite mud as before using the same procedure as described in the preceding examples. The results are shown in the following table:

| Additive | Percent zinc in add. based extract or liquor solids | pH | Apparent viscosity, cp. | Gel strength, lbs./100 sq. ft. | | Fluid loss, ml./30 min., API |
|---|---|---|---|---|---|---|
| | | | | 0 min. | 10 min. | |
| None (control) | 0 | 8.3 | 110 | 99 | 142 | 6.4 |
| Spent sulfite | 0 | 8.15 | 85.5 | 58 | 80 | 5.8 |
| Do | 2 | 8.10 | 85.0 | 57 | 79 | 6.3 |
| Do | 4 | 8.0 | 78.0 | 54 | 75 | 6.1 |
| Bark extract | 0 | 8.25 | 83.5 | 38 | 66 | 5.8 |
| Do | 2 | 8.3 | 70.0 | 28 | 62 | 6.0 |
| Do | 4 | 8.35 | 60.0 | 5 | 25 | 6.2 |

The foregoing results show the improvement, particularly in gel strengths, but also in viscosity, which are obtained when the hemlock bark products are treated with zinc. On the other hand, the zinc complexed lignosulfonate is no significant improvement over the non-complexed lignosulfonate.

We claim:

1. An aqueous drilling mud composition comprising a hydratable clay dispersed in water, and a sufficient amount of a polymeric zinc complex to produce a reduction in the viscosity and gel strength of the hydratable clay dispersed in water, said polymeric zinc complex having been prepared by digesting a polyphenolic compound containing material selected from the group consisting of coniferous tree bark and quebracho wood in an aqueous solution of a sulfurious acid salt of metal of the group consisting of sodium and potassium at a temperature of from 105° C. to 200° C. resulting in a sulfited extract, adjusting the pH of the sulfited extract to a pH of between 4.5 to 6.0 and reacting the sulfited extract with a water soluble salt of zinc to form the polymeric zinc complex of said sulfited extract, said zinc complex having from about 2 to 7% by weight zinc.

2. A composition as defined in claim 1 in which the coniferous tree bark is selected from the group consisting of hemlock, Douglas fir, Amabilis fir, southern pine and redwood.

References Cited

UNITED STATES PATENTS

| | | | |
|---|---|---|---|
| 2,331,281 | 10/1943 | Wayne | 252—8.5 |
| 2,605,221 | 7/1952 | Hoeppel | 252—8.5 |
| 2,674,575 | 5/1954 | Lewis et al. | 282—8.5 |
| 2,831,022 | 4/1958 | Van Blaricom et al. | 252—8.5 |
| 2,935,504 | 5/1960 | King et al. | 260—124 |

HERBERT B. GUYNN, *Primary Examiner.*

U.S. Cl. X.R.

260—124, 429.9

UNITED STATES PATENT OFFICE
CERTIFICATE OF CORRECTION

Patent No. 3,431,202　　　　　　　　　　　　　　　　March 4, 1969

Lloyd Eugene Van Blaricom et al.

It is certified that error appears in the above identified patent and that said Letters Patent are hereby corrected as shown below:

Column 1, line 54, "polyphenoilc" should read -- polyphenolic --. Column 3, line 65, "frest" should read -- fresh --. Column 4, first table, seventh column, line 2 thereof, ".76" should read -- 7.6 --. Column 6, line 52, "spend" should read -- spent --. Column 7, line 16, "sulfurious" should read -- sulfurous --.

Signed and sealed this 31st day of March 1970.

(SEAL)
Attest:

Edward M. Fletcher, Jr.
Attesting Officer

WILLIAM E. SCHUYLER, JR.
Commissioner of Patents